(12) United States Patent
Jacobs et al.

(10) Patent No.: US 6,905,237 B2
(45) Date of Patent: Jun. 14, 2005

(54) FIBER OPTIC LIGHTING RADIAL ARRANGEMENT AND METHOD FOR FORMING THE SAME

(76) Inventors: William Alan Jacobs, 6006 Las Colinas Cir., Lake Worth, FL (US) 33463; Brian N. Nover, 6545 Hillside La., Lantana, FL (US) 33462

( * ) Notice: Subject to any disclaimer, the term of this patent is extended or adjusted under 35 U.S.C. 154(b) by 27 days.

(21) Appl. No.: 10/227,666

(22) Filed: Aug. 26, 2002

(65) Prior Publication Data

US 2004/0037090 A1 Feb. 26, 2004

(51) Int. Cl.[7] .......................... D03D 15/00; F21V 7/04; G02B 6/44; G09F 13/18
(52) U.S. Cl. ........................ 362/556; 362/554; 362/565; 362/103; 362/231; 362/806; 385/120
(58) Field of Search ................................ 362/556, 551, 362/554, 565, 566, 567, 568, 103, 104, 108, 121, 122, 124, 231, 806, 807, 808, 582; 385/115, 116, 120

(56) References Cited

U.S. PATENT DOCUMENTS

| | | | |
|---|---|---|---|
| 2,507,909 A | 5/1950 | Keyson | |
| 3,491,245 A | 1/1970 | Hardesty | |
| 3,509,009 A | 4/1970 | Hartmann | |
| 3,681,592 A | 8/1972 | Hugelshofer | |
| 3,878,014 A | 4/1975 | Melead | |
| 4,222,091 A | 9/1980 | Bartenbach | |
| 4,234,907 A | 11/1980 | Daniel | |
| 4,519,017 A | 5/1985 | Daniel | |
| 4,669,817 A | 6/1987 | Mori | |
| 4,754,372 A | * | 6/1988 | Harrison ..................... 362/565 |
| 4,759,605 A | 7/1988 | Shen et al. | |
| 4,767,172 A | 8/1988 | Nichols et al. | |
| 4,860,475 A | 8/1989 | Levy et al. | |
| 4,998,186 A | 3/1991 | Cocca | |
| 5,005,108 A | 4/1991 | Pristash et al. | |
| 5,021,928 A | 6/1991 | Daniel | |
| 5,067,831 A | 11/1991 | Robbins et al. | |
| 5,184,253 A | 2/1993 | Hwang | |
| 5,197,792 A | 3/1993 | Jiao et al. | |
| 5,207,494 A | 5/1993 | Jones | |
| 5,222,795 A | * | 6/1993 | Hed ........................... 362/558 |
| 5,291,577 A | 3/1994 | Zoscak | |
| 5,312,569 A | 5/1994 | Mezei | |
| 5,366,780 A | 11/1994 | Rapisarda | |
| 5,432,876 A | * | 7/1995 | Appeldorn et al. ........... 385/31 |
| 5,436,805 A | 7/1995 | Hsu et al. | |
| 5,499,912 A | 3/1996 | Mezei | |
| 5,521,342 A | 5/1996 | Bartley | |
| 5,560,700 A | 10/1996 | Levens | |
| 5,572,818 A | 11/1996 | Churchill | |
| 5,573,017 A | 11/1996 | Post | |
| 5,636,914 A | 6/1997 | Trusiani | |

(Continued)

Primary Examiner—Sandra O'Shea
Assistant Examiner—Sharon Payne
(74) Attorney, Agent, or Firm—Allen D. Hertz

(57) ABSTRACT

An apparatus and method of manufacture is disclosed for a fiber optic lighting device. The fiber optic lighting device is formed by adhering fiber optic strands onto a backing material in a radial pattern from a centralized illumination receiving port within a perimeter of the backing material. The centralized illumination receiving port of the fiber optic strands is where the illuminating source would transfer the illuminations into the fiber optic strands. The fiber optic strands can include a surface finish, which enhances the intensity of the light emitting from the fiber optic strands. The fiber optic lighting device can provide a non-linear sheared edge along the entire perimeter of the backing material.

28 Claims, 11 Drawing Sheets

U.S. PATENT DOCUMENTS

| | | |
|---|---|---|
| 5,727,577 A | 3/1998 | Post |
| 5,865,533 A * | 2/1999 | Liu .......................... 362/583 |
| 5,944,416 A | 8/1999 | Marsh |
| 5,959,316 A | 9/1999 | Lowery |
| 6,021,243 A | 2/2000 | Fasanella et al. |
| 6,058,228 A | 5/2000 | Fasanella et al. |
| 6,128,431 A | 10/2000 | Siminovitch |
| 6,158,867 A | 12/2000 | Parker et al. |
| 6,174,075 B1 | 1/2001 | Fuwausa |
| 6,217,188 B1 * | 4/2001 | Wainwright et al. ........ 362/103 |

* cited by examiner

FIBER OPTIC LIGHTING RADIAL ARRANGEMENT AND METHOD FOR FORMING THE SAME

FIELD OF THE INVENTION

The present invention relates to an arrangement of fiber optic strands that employs a radial arrangement, which allows a more compact design and adds the ability to define and permit light to emit from the complete perimeter of the arrangement.

BACKGROUND OF THE INVENTION

There are numerous invents utilizing fiber optic lighting as a panel for illuminating an object.

Poly-optical Products commercial distributes a product referred to as Two-layer Uniglo® manufactured under U.S. Pat. Nos. 5,312,569 and 5,499,912. The apparatus comprises a backing member, a plurality of fiber optic strands, the strands are adhered to the backing member in a linear, parallel format, and positioned proximate an adjacent strand to manufacture a ribbon type material. The fiber optic strands separate the backing material and are gathered onto a collector. An illumination source, such as an LED is then coupled to the collector by a coupling device providing a means to control the transference of light from the illumination source into the fiber optic strands.

The light emission has the greatest intensity at the sheared end of each strand. The apparatus is limited in the requirement of an "illumination sourcing tail section" that separates from the backing material and is gathered into a collector. This illumination sourcing tail section can be referred to as a "hot spot" whereby the light intensity is greater and less uniform than the ribbon section. The perimeter of the ribbon can not sheared along the tail section thus limiting the outline of the apparatus as well as the illuminated outline of the apparatus.

Daniel (U.S. Pat. No. 4,519,017) teaches a light emitting optical fiber assembly that employs a non-woven geometric grid which can be cut or sectioned without losing all light emitting capabilities. FIGS. 2–6 illustrate fiber optic materials of continuous strands, using the frame and means of wrapping to create the desired pattern. FIGS. 7 and 8 illustrate the application of placing fibers through apertures within the backing material to create a pattern. Daniel is limited in the same manner as the Poly-Optical product, requiring an illumination sourcing tail section.

Marsh (U.S. Pat. No. 5,944,416) teaches an ornamental application of light pipes positioned between flexible sheets. Marsh is limited in the same manner as the Poly-Optical product, requiring an illumination sourcing tail section.

Harrison (U.S. Pat. No. 4,754,372) teaches an illuminable covering of a textile material with at least one lighting source connected to the back of the textile material. Harrison is limited in the same teachings as the above cited arts, wherein Harrison teaches the application of a bundle of light-transmissive fibers to illuminatively couple the fiber optic fibers to the illumination source. Harrison is further limited in the application of the Harrison invention wherein Harrison utilizes the porosity of the textile material to position the ends of the fiber optic strands to provide points of illumination. Harrison is thus limited in that Harrison utilizes the ends of the fiber optic strands for illumination and does not provide a means to illuminate the entire surface area of the material. This is further substantiated within the specification, wherein Harrison describes creating patterns of illumination.

Fuwausa (U.S. Pat. No. 6,174,075) teaches an illuminated ornamental device, the device using a pliable plastic for transmitting light such as sourced from an LED, formulated for maximum dispersion of light through the unit. Fuwausa is limited in that the object shape is molded, and pliable plastic and of a shape conducive to evenly illuminating the device.

Each of the above illuminating devices is limited in the ability to freely shape the object. The more desirable, fiber optic material devices are limited by the inclusion of an illumination sourcing tail section. The molded objects are limited by the physics to control the emissions within the shape and size of the molded object. Small objects such as watches, pagers, cell phones, key rings, PDA's, toys, and the like are not conducive to fiber optic panels which include an illumination sourcing tail section. Use in objects, which are manufactured of cloth, are further limited in applications of fiber optic panels that require the illumination sourcing tail section.

Each of the above taught devices require a coupling device, commonly referred to as a fiber optic ferrule. The fiber optic ferrule gathers the bundle of fiber optic strands of the illumination sourcing tail section and couples the illumination source to the fiber optic light panel.

A number of lights emitting panels are contained in the prior art that teach lateral emission of light along the length of the fibers. Various methods to disrupt the index of refraction are used and have been in practice for a number of years.

Daniel (U.S. Pat. No. 4,234,907) teaches a light emitting fabric, utilizing woven optical fibers to provide an illuminated fabric. Daniel utilizes an illumination sourcing tail section to provide illumination to the fabric. Daniel further provides an enhancement of the illumination from the fiber optic strands by introducing small scratches that pierce the outer coating. Daniel is limited in the requirement of the illumination sourcing tail section and by providing a woven pattern, Daniel is limited in the shape of the perimeter of the fabric.

Levens (U.S. Pat. No. 5,560,700) teaches a light coupler utilizing an array of non-imaging optical microcouplers for collecting sunlight and distributing it within a building. The teachings are limited to a spherical surface. The teachings utilize a hemispherical cone as a means to focus the transfer of light. Levens is limited to a curved surface, requiring the curved shape as a means to focus the illumination from the illumination source to the fiber optic strands.

Fasanella, et al. (U.S. Pat. No. 6,021,243) teaches a low cost star coupler for use in optical data networks. The star coupler taught comprising a support plate having groves in which polymer optical fibers may be placed and a central aperture. The apparatus is a modular design used to facilitate replacement of fibers. The teaching is limited to an apparatus for coupling fiber optical fibers. The teachings are limited to a coupling apparatus with the apparatus requiring slots and distal proximities between adjacent polymer optic fibers, thus being such that it is incapable of providing illumination such as a backing panel.

Fasanella, et al. (U.S. Pat. No. 6,058,228) teaches a cost effective side-coupling polymer fiber optics for optical interconnections, whereby the coupler utilizes mirrors comprising a notch and mirrors to transfer the optical signals from one fiber bus to a second fiber bus. Fasanella, et al is limited in the location of the optical source similar to the sourcing of the above devices.

What is desired is an apparatus, which can provide evenly distributed illuminations and illuminate the entire perimeter.

SUMMARY OF THE INVENTION

One aspect of the present invention is to provide a fiber optic light panel lacking an illumination source tail section.

A second aspect of the present invention is to provide a fiber optic light panel whereby the light can be emitted along the entire perimeter of the panel.

A third aspect of the present invention is to provide an optically coupling an illumination source to a plurality of fiber optic strands positioned about a centralized illumination receiving port, wherein the centralized illumination receiving port is a position within the perimeter of said fiber optic light panel.

A fourth aspect of the present invention is to provide an aperture within the fiber optic light panel, said aperture is positioned proximate said centralized illumination receiving port.

A fifth aspect of the present invention is to position the illumination source proximate at least one of said centralized illumination receiving port and said aperture.

A sixth aspect of the present invention is to provide multiple centralized illumination receiving ports within the perimeter of said fiber optic light panel.

A seventh aspect of the present invention is to provide multiple apertures respective to said multiple centralized illumination receiving ports.

An eighth aspect of the present invention is to position multiple illumination sources respective to at least one of multiple centralized illumination receiving ports and multiple apertures.

A ninth aspect of the present invention is the ability to utilize multiple colors of illumination by positioning differing colors of illumination sources to multiple centralized illumination receiving ports.

A tenth aspect of the present invention is to provide a light diffuser covering said illumination source and centralized illumination receiving ports to obtain an intensity matching that of the adjacent fiber optic light panel.

An eleventh aspect of the present invention is the ability to shear the entire perimeter of said fiber optic light panel at any angle between zero and 180 degrees respective to the radial line of the center of the centralized illumination receiving port and the contact point on the perimeter.

A twelfth aspect of the present invention is the ability to shape the fiber optic light panel into a figurative shape.

A thirteenth aspect of the present invention is the ability to shape the fiber optic light panel into a figurative shape, the shape comprising the entire outline of said fiber optic light panel.

A fourteenth aspect of the present invention is the inclusion of a modified surface finish of the fiber optic strands to enhance the intensity of illumination along the length of the fiber optic strand.

A fifteenth aspect of the present invention is the inclusion of at least one reduced length fiber optic strand, whereby the reduced length fiber optic strand is oriented radially from at least one centralized illumination receiving port to a position distant from the perimeter of said fiber optic light panel providing points of illumination at greater intensity than the surrounding panel.

A sixteenth aspect of the present invention is the ability to manufacture said fiber optic light panel.

A seventeenth aspect of the present invention is the placement of the fiber optic strands in a radial orientation.

An eighteenth aspect of the present invention is the placement of the fiber optic strands through an aperture within a backing material.

A nineteenth aspect of the present invention is the use of a vacuum to assist in the positioning of the fiber optic strands onto the light panel backing material.

A twentieth aspect in the positioning of the fiber optic fiber utilizes centrifugal forces to assist in the positioning of the fiber optic strands onto the light panel backing material.

A twenty-first aspect of the present invention is the use of a shaped placement head to assist in positioning of said fiber optic strands.

A twenty-second aspect of the present invention is whereby said shaped placement head is of at least one of planar, concave, spherical, conical, or egg shaped, and the like.

A twenty-third aspect of the present invention is the placement of the fiber optic strands, whereby a first end of the fiber optic strands is positioned adjacent the aperture within the fiber optic light panel.

A twenty-fourth aspect of the present invention is the shearing of the fiber optic strands adjacent a centralized illumination sourcing position to create an illumination sourcing port proximate said centralized illumination sourcing position.

A twenty-fifth aspect of the present invention is whereby at least a portion of said centralized illumination exiting ports of the fiber optic strands are sheared prior to said perimeter if said backing member.

A twenty-sixth aspect of the present invention is the whereby the aperture is reinforced by a pliable grommet.

A twenty-seventh aspect of the present invention is the ability to provide multiple colors for illumination.

A twenty-eighth aspect of the present invention is utilization of a flexible material, a rigid material, an opaque material, a translucent material, a non-reflective material, a reflective material, a luminescent material, individually, or in combination as said backing member.

A twenty-ninth aspect of the present invention is the placement of radially arranged fiber optic strands on both sides of the planar backing member.

A thirtieth aspect of the present invention is the application of a plurality of layers of radially arranged fiber optic strands to increase the intensity of illumination.

A thirty-first aspect of the present invention is the use of an adhesive comprising of a luminescent material applied as the adhesive for the plurality of layers of radially arranged fiber optic strands.

A thirty-second aspect of the present invention is the inclusion of multiple-colored illumination sources, whereby the multiple-colored illumination sources are strategically coupled to specific radially arranged fiber optic strands, the coupling positions such to illuminate the present invention in a multi-colored image.

A thirty-third aspect of the present invention is the utilization, directly or indirectly, of a natural illumination source such as daylight.

A thirty-fourth aspect of the present invention is the utilization, directly or indirectly, of a natural illumination source such as daylight, combined with the radially arranged fiber optic strands as a decorative skylight, observatory, and the like.

A thirty-fifth aspect of the present invention is the inclusion of a diffuser, the diffuser designed to increase thermal dissipation from the illumination source.

A thirty-sixth aspect of the present invention is the ability to remove the backing material from the radially arranged fiber optic panel, whereby the adhesive between the plurality of fiber optic strands provides the means for supporting the shape of the plurality of fiber optic strands.

A thirty-seventh aspect of the present invention is the utilization of the radially arranged pattern as a means to index angles for applications such as industrial inspections, and the like.

A thirty-eighth aspect of the present invention is the application of the radially arranged fiber optic panel within a rotating apparatus, such as a fan, and the like.

A thirty-ninth aspect of the present invention is the application of a strobing effect for the illumination source optically coupled to the radially arranged fiber optic panel.

A fortieth aspect of the present invention is the application of multiple layers of radially arranged fiber optic strands in conjunction with multiple centralized illumination receiving positions, whereby the pattern apparatus can present an animated image by synchronously timing the illumination sources. Each specified layer would be coupled to a specified centralized illumination receiving positions, wherein as each illumination source provides illumination, it illuminates a predetermined pattern. As the series of illuminations step through the multiple illuminations, the pattern outputs change, thus animating the radially arranged fiber optic panel.

A forty-first aspect of the present invention is the application of a radially arranged fiber optic panel within a z-axis, resonating structure, such as an audio speaker.

A forty-second aspect of the present invention is the application of a colorant such as translucent or luminescent paint, dye, or "ink" to the top surface of the fiber so that decorative, warning, or instructional patterns can be seen.

A forty-third aspect of the present invention is the application of a solar cell or solar array to power the light source directly or indirectly, or charging of the light power source, thus giving the assembly great mobility.

DETAILED DESCRIPTION OF THE INVENTION

Figure 1:
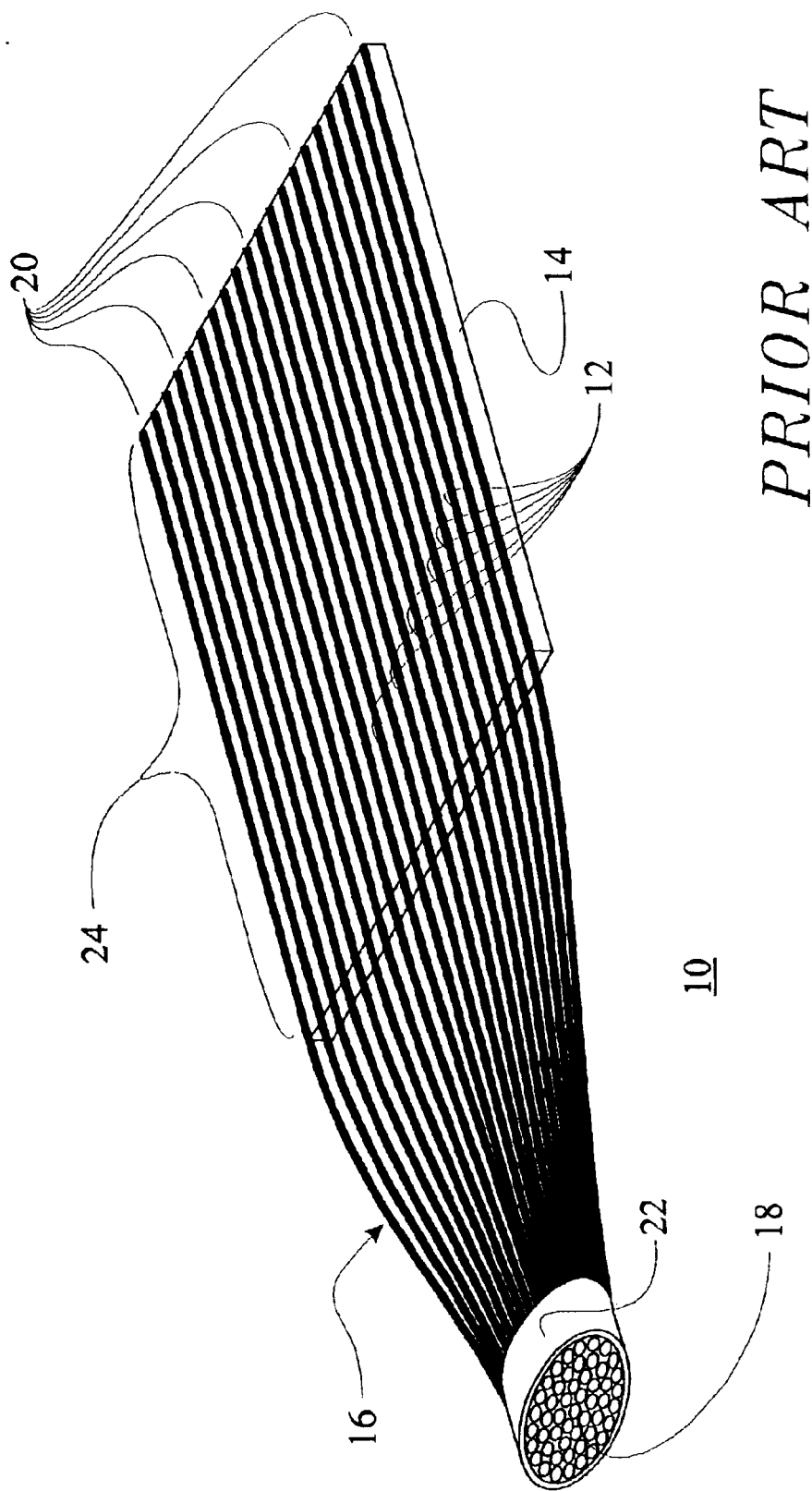
FIG. 1 is an isometric view of a known prior art using a fiber optic ribbon adhered to a backing member.

FIG. 1 is an isometric view of a current, commercially-available, linear fiber optic panel 10 comprising a plurality of fiber optic strands 12 positioned contiguous and parallel one another and adhered to a backing material 14. The plurality of fiber optic strands 12 are arranged into an illumination sourcing tail section 16 and gathered within an optical coupling member 22. The ends of the plurality of fiber optic strands 12 are sheared and polished at the illumination-sourcing end 18 of the plurality of fiber optic strands 12. The illumination source (not shown) would be optically coupled to the illumination sourcing tail section 16 using the optical coupling member 22; the light would travel within the plurality of fiber optic strands 12 across the linear fiber optic panel 10; and exit at an illumination-exiting end 20 of the plurality of fiber optic strands 12. The arrangement of the linear fiber optic panel 10 does not allow the shearing of the plurality of fiber optic strands 12 along a linear edge 24 of the linear fiber optic panel 10. Should the linear edge 24 of the linear fiber optic panel 10 become damaged, the light path will become compromised, thus limiting or no longer transferring the light to the illumination-exiting end 20.

Figure 2:
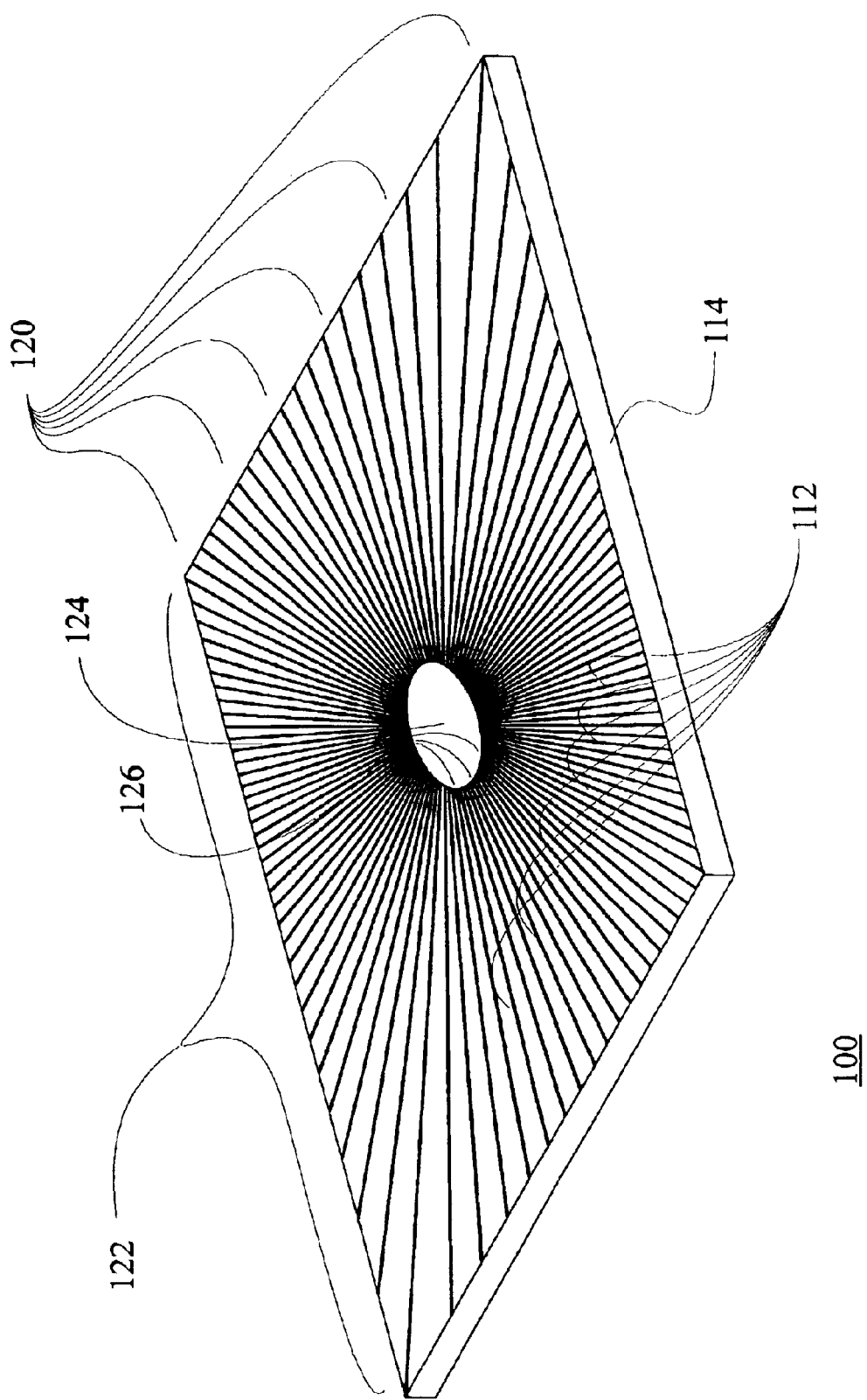
FIG. 2 is an isometric view of a first embodiment as a radially arranged fiber optic light panel representative of the present invention.

FIG. 2 is an isometric view of a first embodiment of the present invention; a radially arranged fiber optic panel 100 comprising a plurality of radially arranged fiber optic strands 112 positioned radially from at least one centralized illumination receiving position 124. The fiber optic strands 112 can be of any light transmissive fibers such as plastic optical fiber, glass optical fiber, and the like. The plurality of radially arranged fiber optic strands 112 comprise a first end being an illumination receiving port 126 and a second end being an illumination exiting port 120. The plurality of radially arranged fiber optic strands 112 are positioned with the centralized illumination receiving port 126 adjacent the at least one centralized illumination receiving position 124 and the illumination exiting port 120 positioned towards a peripheral edge 122 of a radially arranged fiber optic backing member 114. The plurality of radially arranged fiber optic strands 112 are adhered to said radially arranged fiber optic backing member 114 and adjacent plurality of radially arranged fiber optic strands 112. The ends of the plurality of fiber optic strands 112 are sheared and polished at the illumination-sourcing end 126 of the plurality of fiber optic strands 112. The illumination source (not shown) would be optically coupled to the illumination-sourcing end 126 of the plurality of fiber optic strands 112 at said at least one centralized illumination receiving position 124. The light would travel within the plurality of fiber optic strands 112 across the radially arranged fiber optic panel 100; and exit at an illumination-exiting end 120 of the plurality of fiber optic strands 112. The arrangement of the radially arranged fiber optic panel 100 allows the shearing of the plurality of fiber optic strands 112 along the peripheral edge 122 of the radially arranged fiber optic panel 100.

Figure 3:
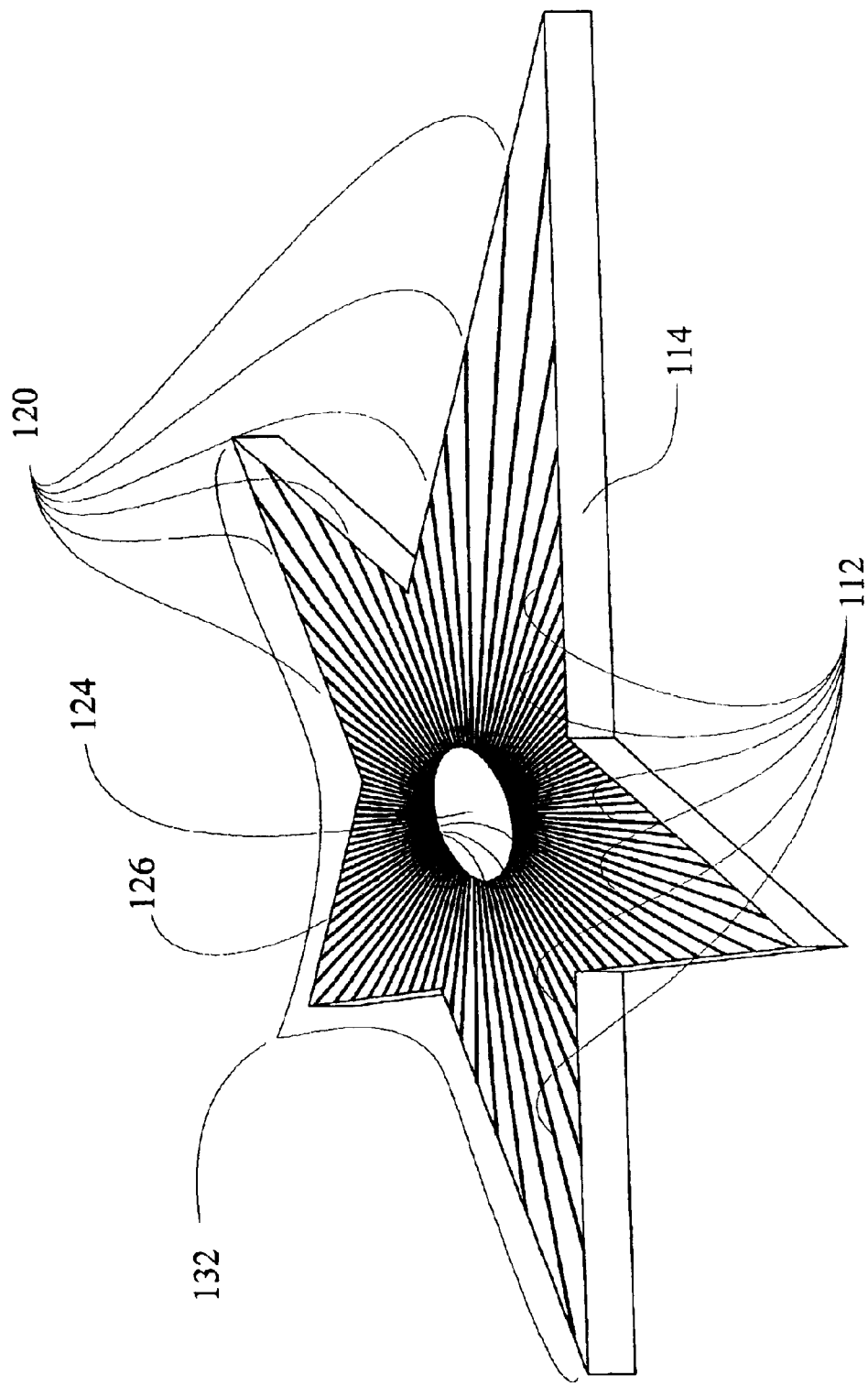
FIG. 3 is an isometric view of a second embodiment as an ornamental, radially arranged fiber optic light panel representative of the present invention.

FIG. 3 is an isometric view of a second embodiment of the present invention; an ornamental, radially arranged fiber optic panel 130 comprising a plurality of radially arranged fiber optic strands 112 positioned radially from at least one centralized illumination receiving position 124. The plurality of radially arranged fiber optic strands 112 are positioned with a centralized illumination receiving port 126 adjacent the at least one centralized illumination receiving position 124 and an illumination exiting port 120 positioned towards an ornamentally shaped, peripheral edge 132 of a radially arranged fiber optic backing member 114. The plurality of radially arranged fiber optic strands 112 are adhered to said radially arranged fiber optic backing member 114 and adjacent plurality of radially arranged fiber optic strands 112. The ends of the plurality of fiber optic strands 112 are sheared and polished at the illumination-sourcing end 126 of the plurality of fiber optic strands 112. The illumination source (not shown) would be optically coupled to the illumination-sourcing end 126 of the plurality of fiber optic strands 112 at said at least one centralized illumination receiving position 124. The light would travel within the plurality of fiber optic strands 112 across the ornamental, radially arranged fiber optic panel 130; and exit at an illumination-exiting end 120 of the plurality of fiber optic strands 112. The arrangement of the ornamental, radially arranged fiber optic panel 130 allows the shearing of the plurality of fiber optic strands 112 along the ornamentally shaped, peripheral edge 132 of the an ornamental, radially arranged fiber optic panel 130.

The various embodiments can be further enhanced with the inclusion of additional centralized illumination receiving positions 124 to provide for additional sources for illumination. The additional sources can provide a means for applying multiple colors of light to the various embodiments of the present invention. A portion of the plurality of fiber optic strands 112 can be sheared at a position prior to the peripheral edge 122, 132 of the present invention as a means to increase the intensity of light at positions within the peripheral edge 122, 132 of the present invention.

Figure 4:
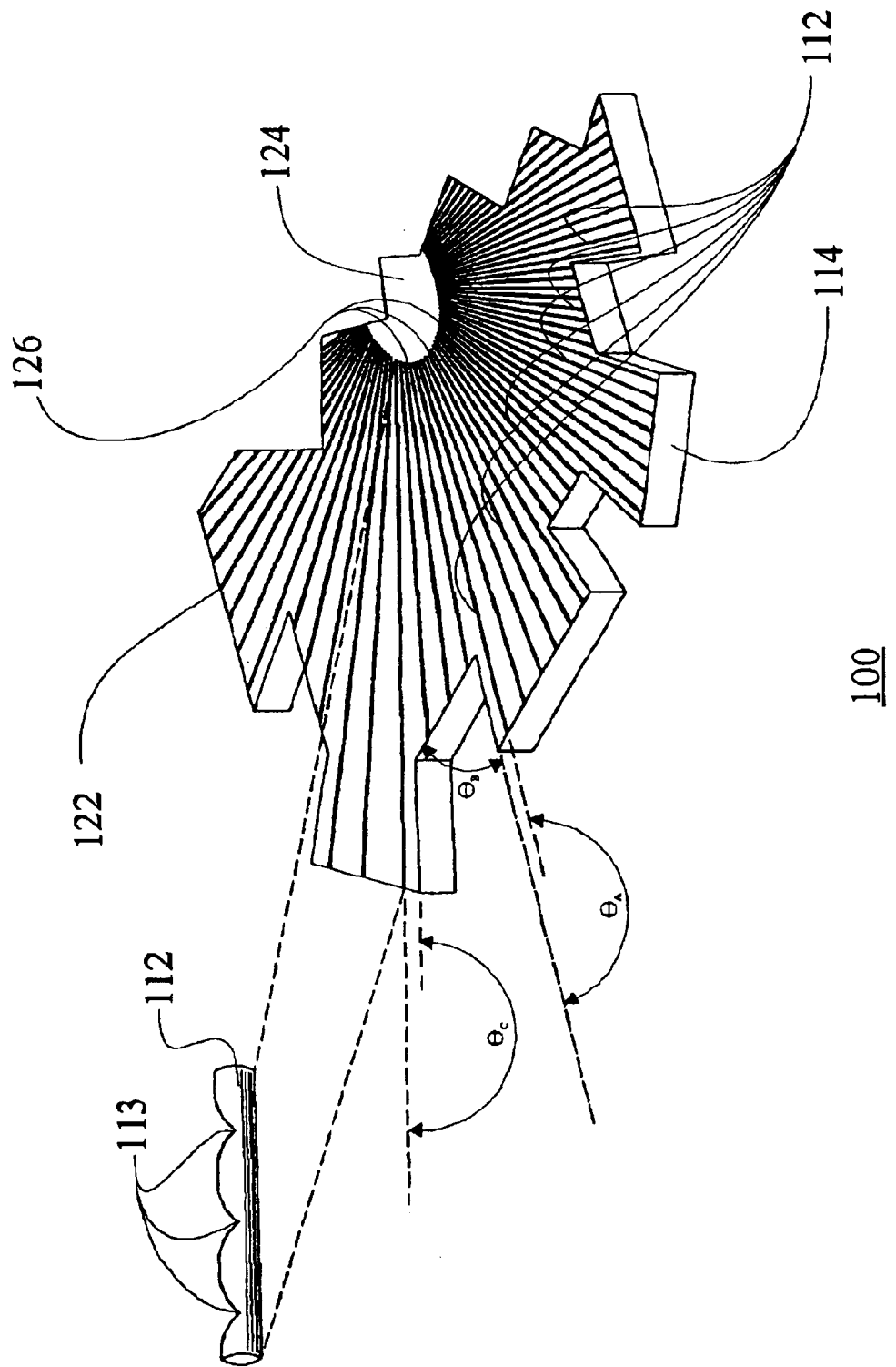
FIG. 4 is an isometric view of a section of a radially arranged fiber optic light panel illustrating the benefits of the present invention.

FIG. 4 illustrates a section of an isometric view of a radially arranged fiber optic panel 100 illustrating the benefit of the present invention. The present invention provides the ability to shape the outline of the radially arranged fiber optic panel 100 in a non-rectangular shape. The radially arranged plurality of fiber optic strands 112 allows the designer to shear the radially arranged fiber optic panel 100 at angles described herein when following the perimeter 122 of the radially arranged fiber optic panel 100 as described in a clockwise direction. The angles described provide the capabilities of the present invention, wherein the actual embodiments reduced to practice may not have the severity of angles as described, while maintaining the same spirit and intention of the present invention. The perimeter 122 can have a first angle $\theta_A$ shearing the radially arranged fiber optic panel 100 up to 180 degrees (parallel) to the adjacent fiber optic strand 112 towards the at least one centralized illumination receiving position 124. The perimeter 122 has a second angle $\theta_B$ shearing the radially arranged fiber optic panel 100 the second angle $\theta_B$ equal to or greater than 0 degrees and equal to or less than 180 degrees respective to the adjacent fiber optic strand 112. If the shearing were greater than 180 degrees, the shearing would disunite the continuity of the fiber optic strand 112, thus limiting the transfer of the illumination at the point of disunity. The perimeter 122 has a third angle $\theta_C$ shearing the radially arranged fiber optic panel 100 the third angle $\theta_C$ being up to 180 degrees (parallel) to the adjacent fiber optic strand 112 away from the at least one centralized illumination receiving position 124. The present invention provides the designer the capability of incorporating angles as described herein and completely circumventing the at least one centralized illumination receiving position 124. One perfect application of the present invention illustrating the advantage over the prior art would be a round shaped object requiring a back lighting, such as an automotive gauge.

The figure further illustrates an enlarged section of a fiber optic strand 112, wherein the enlarged section of the fiber optic strand 112 comprises deformations 113 in the surface of the fiber optic strand 112.

Figure 5:
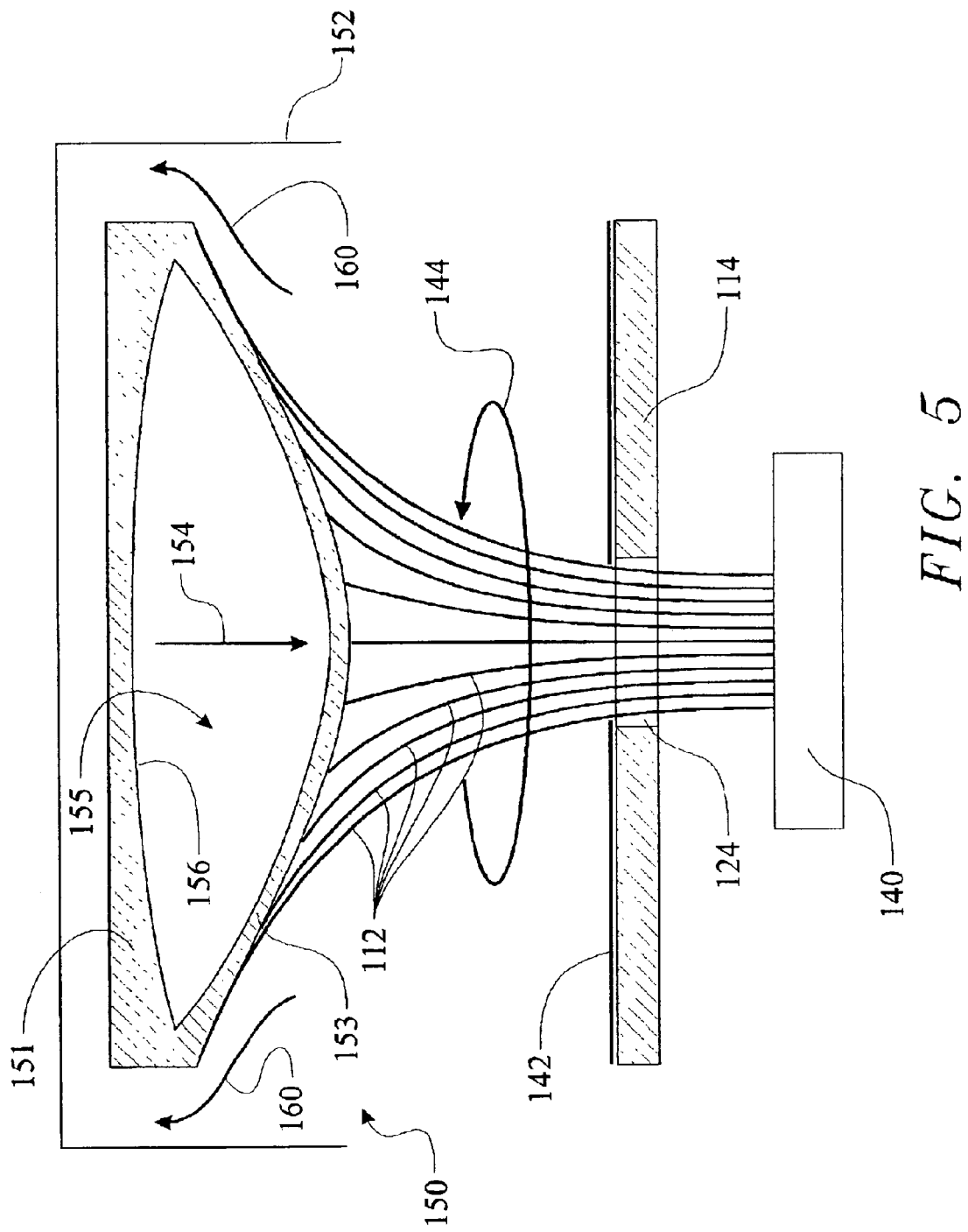
FIG. 5 illustrates a first phase and state of respective tooling for one embodiment of manufacture of a radially arranged fiber optic light panel.

FIG. 5 illustrates a first phase in a first embodiment of the steps of manufacture to fabricate the present invention, the first phase being the radial arrangement of a plurality of fiber optic strands 112. The manufacturing process would include a fiber optic bundle feeding mechanism 140 which directs a predetermined length of fiber optic strands 112 through the at least one centralized illumination receiving position 124 of the fiber optic backing member 114 towards a radially arranging placement head 150. The radially arranging placement head 150 can comprise of a radially arranging forming member 151 and a vacuum directing member 152. The radially arranging forming member 151 comprises a placement surface 153, a compression region 155 and a compression supporting surface 156. The radially arranging forming member 151 would have a normally non-compressed state providing a normally non-compressed force 154 when the radially arranging forming member 151 is positioned in the radially directing position (as shown). The process can apply a rotational force 144 to the plurality of fiber optic strands 112 to utilize centrifugal force as a means to assist in positioning the plurality of fiber optic strands 112 into the desired radial positions. The fiber optic bundle feeding mechanism 140 can be utilized to apply the rotational force 144 to the plurality of fiber optic strands 112 by shearing the plurality of fiber optic strands 112, temporarily coupling the plurality of fiber optic strands 112 to the fiber optic bundle feeding mechanism 140, and rotating the fiber optic bundle feeding mechanism 140. An adhesive layer 142 can be applied to the fiber optic backing member 114 prior to the positioning of the plurality of fiber optic strands 112 onto the fiber optic backing member 114. This can expedite the manufacturing process. A vacuum force 160 can be applied to further assist in the radially positioning process, whereby the vacuum force 160 would assist in drawing the plurality of fiber optic strands 112 evenly against the radially arranging forming member 151.

Figure 6:
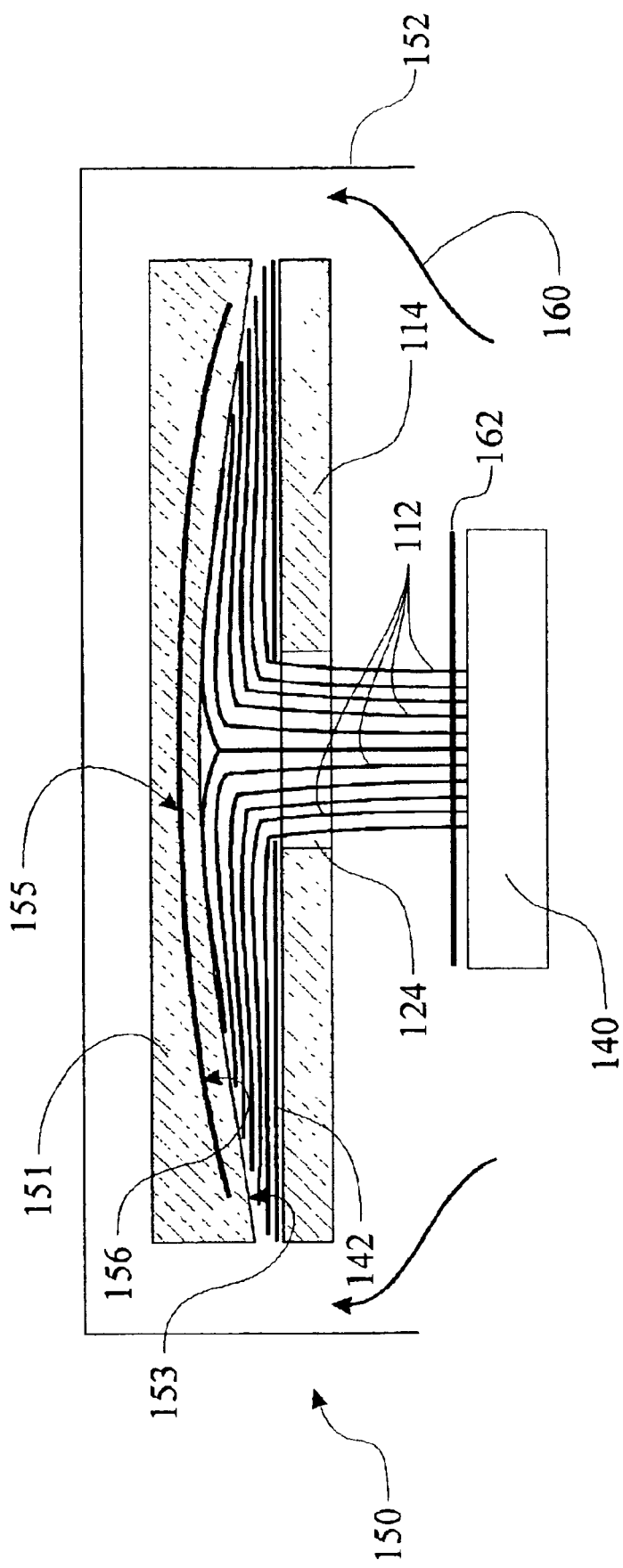
FIG. 6 illustrates a second phase and state of respective tooling for one embodiment of manufacture of a radially arranged fiber optic light panel.

FIG. 6 illustrates a second phase in the first embodiment of the steps of manufacture to fabricate the present invention, the second phase being the positioning of the radially arranged plurality of fiber optic strands 112 onto the fiber optic backing member 114. The plurality of fiber optic strands 112 are positioned in a radially arranged pattern within the first phase of the manufacturing process. The plurality of fiber optic strands 112 are then positioned onto the fiber optic backing member 114 by bringing the fiber optic backing member 114 and the radially arranging placement head 150 proximate each other. The contacting force (not shown) would overcome the normally non-compressed force (154 of FIG. 4) and cause the compression region 155 to collapse as shown. The compression supporting surface 156 would provide support beyond the dimensions provided by the collapse of the compression region 155. The placement surface 153 would apply a placing force (not illustrated) to position the plurality of fiber optic strands 112 onto the fiber optic backing member 114. Bonding between the plurality of fiber optic strands 112 and the fiber optic backing member 114 can be completed by any of commonly known means, including, but not limited to pre-applied adhesives, spray adhesives, liquid adhesives, heating, and ultrasonic welding. The vacuum force 160 can optionally be continuously applied to assist in maintaining a radial arrangement of the plurality of fiber optic strands 112 against the placement surface 153. Upon completion of the bonding process, a shearing mechanism 162 would shear, and preferably polish, the plurality of fiber optic strands 112. One alternative shearing mechanism 162 would be a punching process, whereby the shearing mechanism 162 vertically shears the plurality of fiber optic strands 112 proximate the at least one centralized illumination receiving position 124. The final phase of the manufacturing process (not illustrated) would be shaping the radially arranged fiber optic panel 100 by shearing the radially arranged fiber optic panel 100. One means of accomplishing this is using a steel rule die shearing apparatus.

The illumination exiting ports (120 of FIG. 2) provide a greater intensity of light compared to the intensity of light emitted along the length of the fiber optic strands 112. The plurality of fiber optic strands 112 can be applied to the fiber optic backing member 114 in several repeated steps, whereby the lengths can be varied. The varied lengths (as shown) positions the illumination exiting ports 120 across the radially arranged fiber optic panel 100, as opposed to only being along the sheared edge(s).

Figure 7:
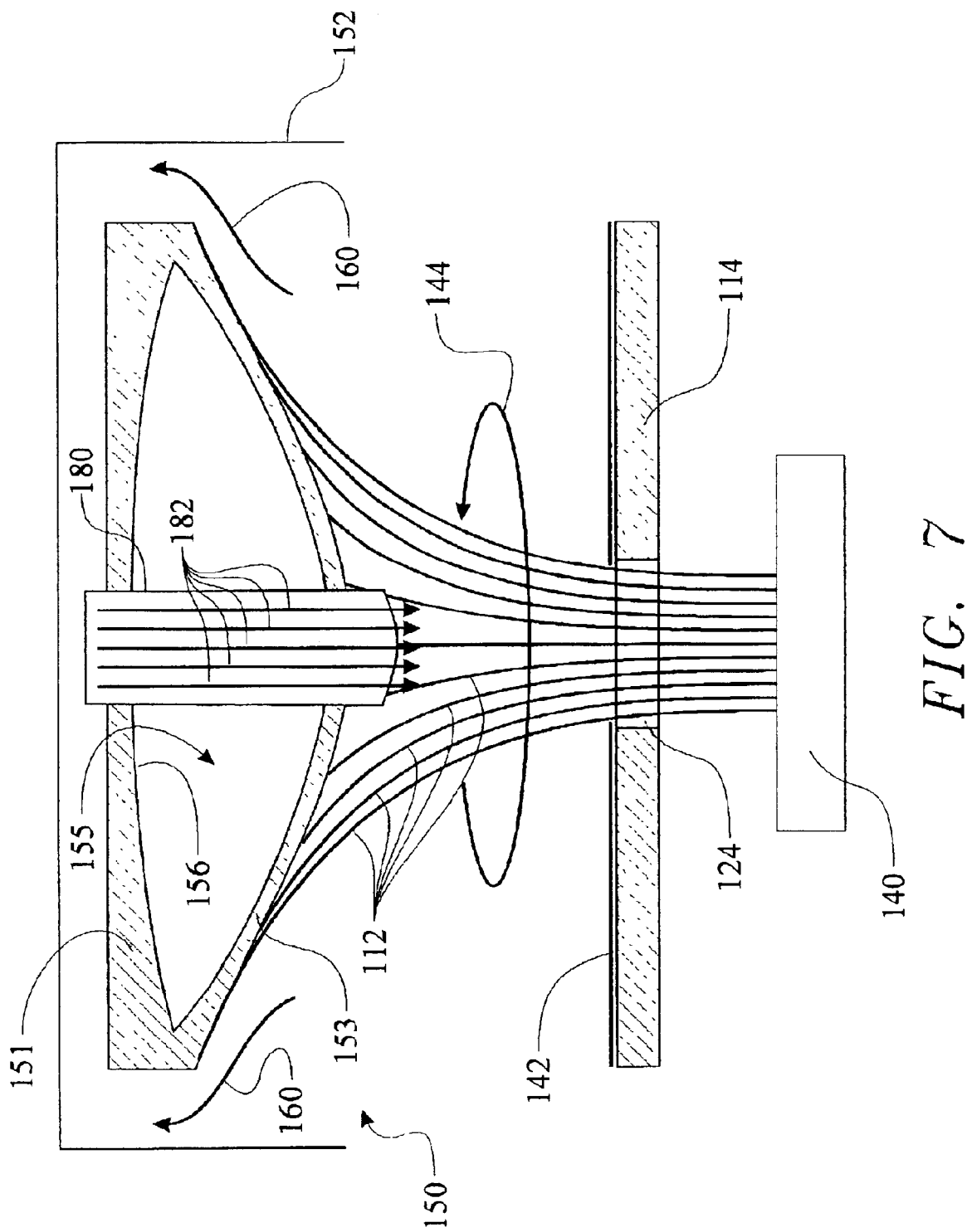
FIG. 7 illustrates an alternate embodiment of the first phase and state of respective tooling for an alternate embodiment of manufacture of a radially arranged fiber optic light panel.

FIG. 7 illustrates an alternate embodiment of the first phase of manufacturing of the radially arranged fiber optic panel 100. The alternate first phase would comprise the same members as described as within the first embodiment above, with the addition of an air flow, radially position assistance port 180. The air flow, radially position assistance port 180 would provide air flow 182 directed towards the center of the plurality of fiber optic strands 112 fed from the fiber optic bundle feeding mechanism 140. The air flow 182 would assist in positioning the plurality of fiber optic strands 112 into a radial position as shown. The air flow, radially position assistance port 180 can be elastically coupled to the radially arranging placement head 150 wherein the air flow, radially position assistance port 180 can elastically adjust vertically to modify the position of the air flow, radially position assistance port 180 respective to the placement surface 153 of the radially arranging forming member 151. During the first phase of manufacture, the air flow, radially position assistance port 180 can be positioned protruding from the placement surface 153 towards the fiber optic bundle feeding mechanism 140. During the second phase of manufacture, the air flow, radially position assistance port 180 can be positioned proximate the placement surface 153. One means to accomplish this would be to place a compliant member such as rubber, a spring, and the like, at least one of coupled to and behind the air flow, radially position assistance port 180.

An alternate embodiment would be to utilize electro-static charge to assist in positioning the plurality of fiber optic strands 112 into a radial position. The manufacturing apparatus can apply a charge to the plurality of fiber optic strands 112, preferably at the fiber optic bundle feeding mechanism 140. An electro-static charge, with a polarity opposing the charge applied to the plurality of fiber optic strands 112, would be discharged by a member positioned similar to the air flow, radially position assistance port 180 illustrated. The opposing charges would assist in positioning the plurality of fiber optic strands 112 into a radial position.

Figure 8:
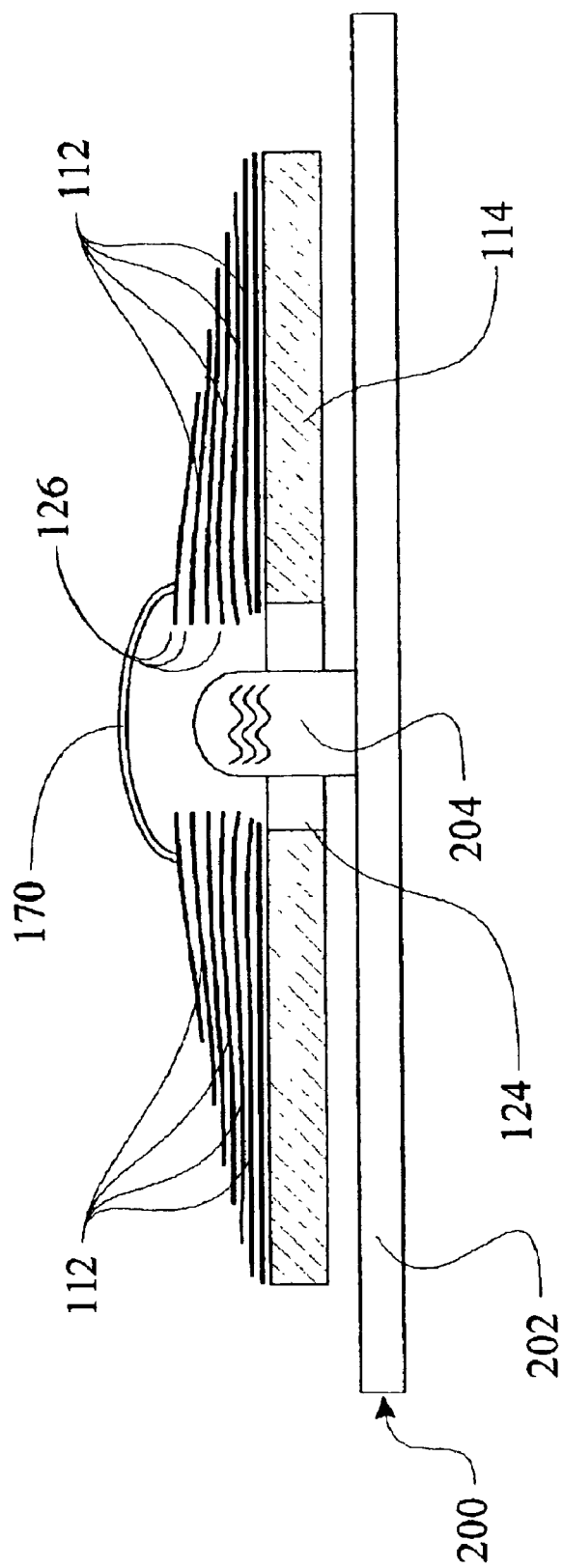
FIG. 8 is a cross sectional drawing illustrating an installed radially arranged fiber optic light panel, the illustration further comprising a detailed cross sectional drawing illustrating a diffuser.

FIG. 8 illustrates the radially arranged fiber optic panel 100 incorporated within a proposed application. The radially arranged fiber optic panel 100 would be positioned with the centralized illumination receiving position 124 proximate an illumination source 204. The illustration presents a Printed Circuit Assembly 200, the Printed Circuit Assembly 200 comprising a Printed Circuit Board 202, a respective illumination source driving circuit (not shown), and the illumination source 204. The illumination source 204 would be optically coupled with the centralized illumination receiving port 126 of each of the plurality of fiber optic strands 112. A light diffuser 170 can be coupled to the assembly proximate the illumination source 204. It would be preferred that the light diffuser 170 be of a material, transparency, and/or coloration which illuminates to an intensity and colorization similar to that emitted by the plurality of fiber optic strands 112 of the radially arranged fiber optic panel 100. The present invention can be furthered by the inclusion of a plurality of illumination sources 204. The present invention can be furthered wherein the illumination source(s) 204 can emit multiple colors. A first means of accomplishing multiple colors can be accomplished by providing a plurality of illumination sources 204, whereby at least one of the illumination sources 204 illuminates a first color and at least a second of the illumination sources 204 illuminates a second color. A second means of accomplishing multiple colors can be accomplished by providing at least one of illumination source 204, whereby the least one of illumination source 204 is capable of illuminating in multiple colors. One such available illumination source 204 would be a bi-color LED. A third means of providing multiple colors to the illumination source 204 is by including a color wheel (not shown), the color wheel being a color-tinted, translucent material positioned between the illumination source 204 and the plurality of fiber optic strands 112. The color wheel can be coupled in a manner providing the ability to change in position respective to the illumination source 204. If the color wheel comprises multiple colors, the color can be changed by changing the position of the color wheel respective to the illumination source 204.

Figure 9:
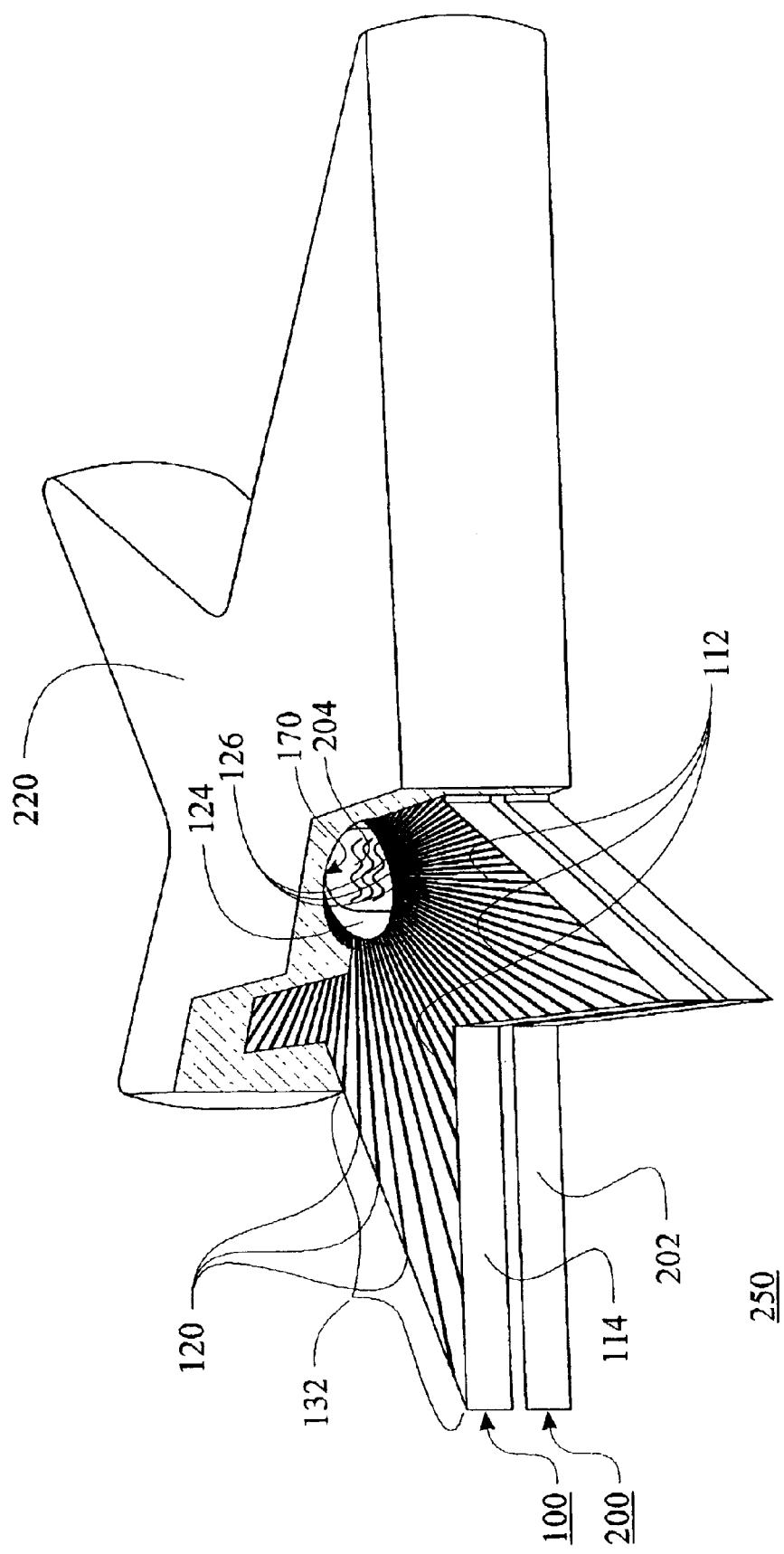
FIG. 9 is an isometric view illustrating a single sided, radially arranged fiber optic light panel, further comprising an illumination source and incorporated into an enclosure.

FIG. 9 illustrates an isometric view of the radially arranged fiber optic panel 100 incorporated within a proposed application as one embodiment of an end product. The embodiment shown is representative of the first reduction to practice achieved by the inventors. The illustrated embodiment comprises the radially arranged fiber optic panel 100, a Printed Circuit Assembly 200, the Printed Circuit Assembly 200 comprising a Printed Circuit Board 202, a respective illumination source driving circuit (not shown), and the illumination source 204. The radially arranged fiber optic panel 100 and Printed Circuit Assembly 200 are coupled to an enclosure 220 (shown as a cutaway section). The illumination source 204 provides illumination to the plurality of fiber optic strands 112. The plurality of fiber optic strands 112 distribute the illumination radially whereby the illumination is emitted through the external surface of the fiber optic strands 112. The distribution of the plurality of fiber optic strands 112 provides illumination across the entire surface area of the radially arranged fiber optic panel 100, illuminating the enclosure 220. A light diffuser 170 can be integrated within the enclosure 220. Additional illumination can be provided from the illumination exiting ports 120. Features can be provided within the enclosure to direct the illumination from the illumination exiting ports 120 across the surface area of the enclosure 220. The surface of the enclosure 220 can be textured to change the intensity of the illumination. The enclosure can be manufactured to become more appealing, including such features as colored materials, variations in transparency, images molded within the enclosure, and other known molding processes. The apparatus can include variations for providing color(s) to the illumination. Some examples of applications include, but are not limited to: key chain, Christmas, and other ornaments (first reduction to practice), picture frames, fabric and clothing, art pieces, cell phones, pagers, computers, personal data assistants, automotive accessories, sporting goods, medical devices, musical instruments, training mechanisms, pins, toys (Frisbee, tops, Yo-Yo's, etc.) signs, cards (business, greeting, playing, etc.), trophies and plaques, accent lighting, and timepiece (watch, clock, etc.).

Figure 10:
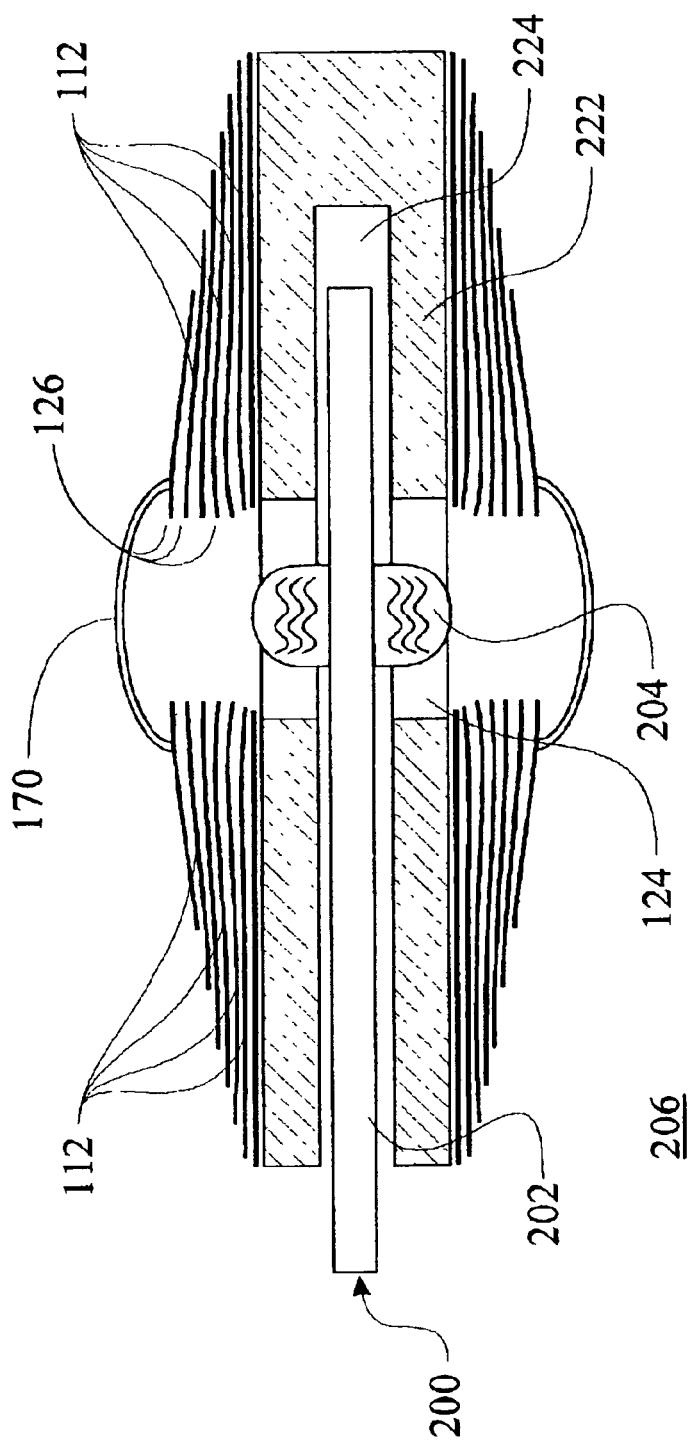
FIG. 10 is a cross sectional drawing illustrating an installed radially arranged fiber optic light panel with radially arranged fiber optic strands positioned on both sides of the backing member.

FIG. 10 illustrates an installed, encapsulating radially arranged fiber optic light panel 206 with a plurality of radially arranged fiber optic strands 112 positioned on two opposing sides of an encapsulating backing member 222. The encapsulating radially arranged fiber optic light panel 206 comprises an illumination sourcing compartment 224 positioned either between two backing members (114 of FIG. 8) or within the encapsulating backing member 222. The plurality of radially arranged fiber optic strands 112 can be coupled to one or both sides of the encapsulating backing member 222. The application can provide two (or more) illumination sources 204 as shown to provide illumination to the plurality of radially arranged fiber optic strands 112. A Printed Circuit Assembly 200, the Printed Circuit Assembly 200 comprising a Printed Circuit Board 202, a respective illumination source driving circuit (not shown), and the illumination source 204 is shown as a means for providing illumination to the encapsulating radially arranged fiber optic light panel 206. The Printed Circuit Assembly 200 can be double sided to provide the illumination source 204 to both sides of the encapsulating radially arranged fiber optic light panel 206. Alternatively, the illumination source 204 can be positioned proximate the at least one centralized illumination receiving position 124. The illumination source 204 can be powered by any remote means such as a circuit comprising a power source, wires, and a switch.

Figure 11:
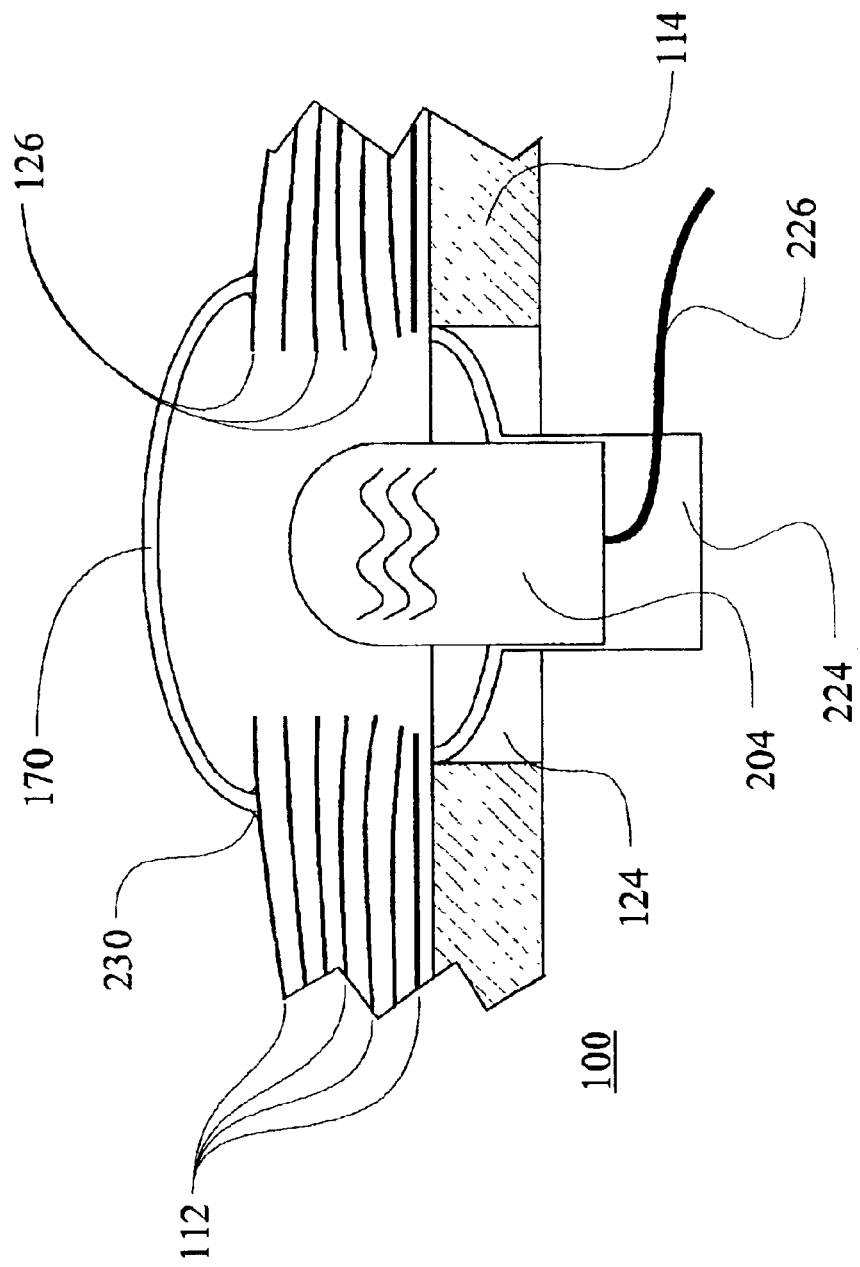
FIG. 11 is a cross sectional view providing a more detailed illustration of a proposed diffuser.

FIG. 11 illustrates a more detailed view of two diffuser concepts. The diffuser 170 can be positioned above the illumination source 204 and coupled to the radially arranged fiber optic panel 100. The diffuser 170 can be of any material, but preferably the material would be of a translucence providing an intensity that is comparable to that of the adjacent fiber optic strands. If the design is such that the illumination at the diffuser 170 is not desired, the diffuser 170 can comprise a reflective material to assist in directing the illumination towards the illumination receiving port 126. An illumination backing diffuser 224 can be incorporated, the illumination backing diffuser 224 providing a means to direct the illumination towards the illumination receiving port 126. The illumination backing diffuser 224 can be used to couple the illumination source 204 to the radially arranged fiber optic panel 100. One means of accomplishing this would be a friction fit between the illumination backing diffuser 224 and the aperture respective to the centralized illumination receiving position 124. The illumination source 204 is shown including a conductor 226 which can be a wire. The conductor 226 would be electro-mechanically coupled to a power source (not shown). The illumination backing diffuser 224 can include a reflective material to assist as a means to direct the illumination towards the illumination receiving port 126.

Applications: It can be recognized that the fiber optic backing member 114 can be of a flexible material, preferably woven, a rigid material, an opaque material, a translucent material, a non-reflective material, and a reflective material. This provides a material whereby the end user can couple multiple sections for applications that can be considered "illuminating fabric" for items such as clothing, hats, accessories, and the like. The planar nature of the radially arranged fiber optic panel 100 provides an apparatus whereby the user can create illuminating shapes that can be assembled into ornamental housings, adhered to glass for decorative applications, etc.

Additional applications of the present invention would be: illuminated Pavers™ for lawn, driveway and gardens; dishes and cups, buttons, and emblems for clothing and hats; home and office lighted novelties; furniture; outdoor lighting; targets; standard lighting replacements; airport lighting; night-lights; map-readers; and UFO models.

What we claim is:

1. A radially arranged fiber optic panel, the panel comprising:
    a planar backing member, the planar backing member comprising a planar surface and a perimeter,
    at least one centralized illumination receiving position positioned at least one of proximate the perimeter and within the perimeter of the planar backing member,
    a plurality of fiber optic strands coupled to at least one side of the planar backing member,
    wherein each fiber optic strand comprises an illumination receiving port and an illumination exiting port, and
    wherein the plurality of fiber optic strands are arranged unbundled, proximately parallel, and supported along a majority of the length by the planar backing member, and at least partially circumferentially about the centralized illumination receiving position with the illumination receiving port proximate the centralized illumination receiving position,
    the illumination exiting port positioned at least one of:
    1) projecting towards the perimeter of the planar backing member, and
    2) proximate the perimeter of the planar backing member, and an ornamental encapsulant.

2. The radially arranged fiber optic panel of claim 1, the planar backing member comprising at least one of:
    a) a flexible material,
    b) a rigid material,
    c) an opaque material,
    d) a translucent material,
    e) a non-reflective material
    f) a reflective material,
    g) a luminescent material, and
    h) a colored material.

3. The radially arranged fiber optic panel of claim 2, wherein the plurality of fiber optic strands further comprising a surface, wherein the surface has been treated to include deformations.

4. The radially arranged fiber optic panel of claim 1, wherein the plurality of fiber optic strands further comprising a surface that has been treated to include deformations.

5. The radially arranged fiber optic panel of claim 4, wherein the plurality of fiber optic strands are arranged in a plurality of radially arranged layers.

6. The radially arranged fiber optic panel of claim 1, wherein the plurality of fiber optic strands are arranged in a plurality of radially arranged layers.

7. The radially arranged fiber optic panel of claim 1, the radially arranged fiber optic panel further comprising at least one illumination source, wherein the illumination receiving ports of the fiber optic strands are positioned at least partially circumferentially about the illumination source.

8. The radially arranged fiber optic panel of claim 7, the radially arranged fiber optic panel further comprising at least one illumination source, the at least one illumination source illuminating at least two colors.

9. The radially arranged fiber optic panel of claim 7, the radially arranged fiber optic panel further comprising a light diffuser located proximate the at least one centralized illumination receiving position.

10. A radially arranged fiber optic panel, the panel comprising:
   a planar backing member, the planar backing member comprising a planar surface and a perimeter,
   at least one centralized illumination receiving position positioned within the perimeter of the planar backing member,
   a plurality of fiber optic strands coupled to at least one side of the planar backing member and supported along a majority of the length by the planar backing member,
   wherein each fiber optic strand comprises an illumination receiving port and an illumination exiting port,
   wherein the plurality of fiber optic strands are arranged projecting radially (and greater than 180 degrees) and substantially about a single plane from the centralized illumination receiving position with the illumination receiving port proximate the centralized illumination receiving position,
   the illumination exiting ports positioned at least one of:
   1) projecting towards the perimeter of the planar backing member, and
   2) proximate the perimeter of the planar backing member, and an ornamental encapsulant.

11. The radially arranged fiber optic panel of claim 10, the planar backing member comprising at least one of:
   a) a flexible material,
   b) a rigid material,
   c) an opaque material,
   d) a translucent material,
   e) a non-reflective material
   f) a reflective material,
   g) a luminescent material, and
   h) a colored material.

12. The radially arranged fiber optic panel of claim 11, wherein the plurality of fiber optic strands further comprising a surface, wherein the surface has been treated to include deformations.

13. The radially arranged fiber optic panel of claim 10, wherein the plurality of fiber optic strands further comprising a surface that has been treated to include deformations.

14. The radially arranged fiber optic panel of claim 13, wherein the plurality of fiber optic strands are arranged in a plurality of radially arranged layers.

15. The radially arranged fiber optic panel of claim 10, wherein the plurality of fiber optic strands are arranged in a plurality of radially arranged layers.

16. A radially arranged fiber optic panel, the panel comprising:
   a planar backing member, the planar backing member comprising a planar surface and a perimeter,
   at least one centralized illumination receiving position positioned at least one of proximate the perimeter and within the perimeter of the planar backing member,
   at least one centralized illumination receiving position positioned at least one of proximate the perimeter and within the perimeter of the planar backing member,
   a plurality of fiber optic strands coupled to at least one side of the planar backing member, wherein each strand comprises an illumination receiving port and an illumination exiting port,
   wherein the plurality of fiber optic strands are arranged projecting from the centralized illumination receiving position with the illumination receiving port proximate the centralized illumination receiving position and the illumination exiting port positioned proximate the perimeter of the planar backing member, and
   wherein the plurality of fiber optic strands are arranged in a plurality of layers, whereby the fiber optic strands positioned proximate the centralized illumination receiving position are layered and reduce in layers as the fiber optic strands fan radially from the centralized illumination receiving position to provide additional area coverage.

17. The radially arranged fiber optic panel of claim 16, the planar backing member comprising at least one of:
   a) a flexible material,
   b) a rigid material,
   c) an opaque material,
   d) a translucent material,
   e) a non-reflective material
   f) a reflective material,
   g) a luminescent material, and
   h) a colored material.

18. The radially arranged fiber optic panel of claim 16, wherein the illumination exiting port of the fiber optic strands is positioned proximate the perimeter of the planar backing member, and the perimeter of the radially arranged fiber optic panel is of a non-rectangular shape.

19. The radially arranged fiber optic panel of claim 16, the radially arranged fiber optic panel further comprising an illumination source.

20. The radially arranged fiber optic panel of claim 19, the radially arranged fiber optic panel further comprising an ornamental encapsulant.

21. The radially arranged fiber optic panel of claim 1, wherein the illumination exiting port of the fiber optic strands is positioned proximate the perimeter of the planar backing member, and the perimeter of the radially arranged fiber optic panel is of a non-rectangular shape.

22. The radially arranged fiber optic panel of claim 10, the radially arranged fiber optic panel further comprising at least one illumination source, wherein the illumination receiving ports of the fiber optic strands are positioned at least partially circumferentially about the illumination source.

23. The radially arranged fiber optic panel of claim 10, the radially arranged fiber optic panel further comprising at least one illumination source, the at least one illumination source illuminating at least two colors.

24. The radially arranged fiber optic panel of claim 10, the radially arranged fiber optic panel further comprising a light diffuser located proximate the at least one centralized illumination receiving position.

25. The radially arranged fiber optic panel of claim 10, wherein the illumination exiting port of the fiber optic strands is positioned proximate the perimeter of the planar backing member, and the perimeter of the radially arranged fiber optic panel is of a non-rectangular shape.

26. The radially arranged fiber optic panel of claim 16, wherein the plurality of fiber optic strands further comprising a surface, wherein the surface has been treated to include deformations.

27. The radially arranged fiber optic panel of claim 16, the radially arranged fiber optic panel further comprising at least one illumination source, the at least one illumination source illuminating at least two colors.

28. The radially arranged fiber optic panel of claim 16, the radially arranged fiber optic panel further comprising a light diffuser located proximate the at least one centralized illumination receiving position.

* * * * *